United States Patent [19]

Willaredt

[11] Patent Number: 5,073,768
[45] Date of Patent: Dec. 17, 1991

[54] AUXILIARY SIGNAL LIGHTS

[75] Inventor: Rodney M. Willaredt, Rapid City, S. Dak.

[73] Assignee: Nolan Ulmer, McLaughlin, S. Dak.

[21] Appl. No.: 289,217

[22] Filed: Dec. 23, 1988

[51] Int. Cl.⁵ .............................................. B60Q 1/34
[52] U.S. Cl. .................................... 340/475; 340/468; 340/472
[58] Field of Search ............................. 362/61, 80, 85; 340/465, 471, 472, 473, 475, 476, 477, 478, 479, 463, 468, 431

[56] References Cited

U.S. PATENT DOCUMENTS

| | | | |
|---|---|---|---|
| 1,335,364 | 3/1920 | Brown | 340/109 |
| 1,443,251 | 1/1923 | Elardo | 340/110 |
| 1,580,118 | 3/1923 | Cross | 340/478 |
| 1,594,464 | 8/1926 | Lightner | 340/108 |
| 1,838,789 | 12/1931 | Schepperle | 340/109 |
| 2,207,117 | 7/1940 | Collins | 362/83 |
| 2,602,115 | 7/1952 | Wilkes | 340/109 |
| 3,112,888 | 12/1963 | McKenzie | 362/61 |
| 4,297,675 | 10/1981 | Rubottom et al. | 340/107 |
| 4,449,167 | 5/1984 | Cohen | |
| 4,588,619 | 5/1986 | Fiscus et al. | 362/61 |
| 4,654,761 | 3/1987 | Walsh | 362/308 |
| 4,758,931 | 7/1988 | Gabaldon | 340/479 |
| 4,825,191 | 4/1989 | Ching-Hwei | 340/472 |
| 4,851,810 | 7/1989 | Vitale et al. | 340/468 |

FOREIGN PATENT DOCUMENTS

| | | | |
|---|---|---|---|
| 15982 | 10/1929 | Australia | 340/94 |
| 502566 | 5/1920 | France | 340/111 |

Primary Examiner—Jin F. Ng
Assistant Examiner—B. Tumm
Attorney, Agent, or Firm—Peterson, Wicks, Nemer & Kamrath

[57] ABSTRACT

An auxiliary signal light for use in conjunction with the original equipment signal lights of a vehicle is disclosed including a light panel received within a container shaped base and covered by a translucent, nontransparent cover. The light panel includes a multiplicity of individual light units slidably received in apertures formed in a square, flat plate. Each of the individual light units include a base and a reflector lens which encapsulate a lamp and in the preferred form are factory sealed and replaceable as a unit. The light units are arranged around the perimeter of the square flat plate and along a horizontal diagonal between two corners of the square, flat plate. Thus, the perimeter light units form first and second generally horizontal V-shaped arrowheads pointing in opposite directions. By the utilization of diodes in the electrical interconnection, the diagonal light units are activated when either or both of the arrowheads are activated to form the arrow shank.

16 Claims, 2 Drawing Sheets

AUXILIARY SIGNAL LIGHTS

BACKGROUND

The present invention relates generally to signal lights for vehicles, particularly to signal lights for semi-trailers, trucks, or similar vehicles designed for road travel, and specifically to auxiliary signal lights.

Every vehicle adapted for road use is required to have lighted signals on the rear of the vehicle to indicate turns and stops and to indicate the presence of the vehicle when its lights are on, or by flashing signals, when there is some need to alert other drivers when the vehicle is in a hazardous situation such as moving very slowly in higher speed traffic o when parked for an emergency. All of these signals are used by trucks, trailers, passenger cars, and specialty road vehicles such as motorhomes. However, particularly on larger vehicles, the signals are often relatively small, and often partly covered by dirt so as to have a reduced visibility. These lights also seem to be broken more often on larger vehicles than on passenger cars.

Thus, a need has arisen for signal lights which are more visible and more easily interpreted than existing signals presently provided as original equipment on larger vehicles. Further, a need has arisen for auxiliary signal lights which may be utilized on existing vehicles in conjunction with signal lights provided as original equipment thereon.

SUMMARY

The present invention solves these needs and other problems in the field of electrical signals for vehicles by providing, in the most preferred form, a signal including a multiplicity of lights secured to the vehicle. In a first aspect of the invention, the multiplicity of lights are arranged in the form of first and second arrowheads having a generally horizontal V-shape and pointing in opposite directions forming a square and in the form of an arrow shank extending between the arrowheads arranged along a horizontal diagonal of the square.

In another aspect of the invention, the lights are in the form of individual light units each including a source of light and a reflector lens. The individual light units are included in a light panel which is secured to the vehicle.

It is thus an object of the present invention to provide a novel signal for vehicles.

It is further an object of the present invention to provide such a novel signal which is redundant to the signal lights provided as original equipment on the vehicle.

It is further an object of the present invention to provide such a novel signal which is highly visible and easily interpreted.

It is further an object of the present invention to provide such a novel signal including turn indicators in the form of an arrow including an arrowhead and an arrow shank.

It is further an object of the present invention to provide such a novel signal including a multiplicity of lights so it is not likely that enough of the lights would be inactive so that a question would arise as to the signal given.

It is further an object of the present invention to provide such a novel signal including a multiplicity of replaceable individual light units.

It is further an object of the present invention to provide such a novel signal including a translucent, nontransparent cover to reduce outside sources of light from illuminating the reflector lens.

It is further an object of the present invention to provide such a novel signal of a simple, economical design.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 3 shows a cross sectional view of the auxiliary signal light of FIG. 1 according to section line 3—3 of FIG. 2.

FIGS. 5-7 diagramatic, front views of the signal indications provided by the auxiliary signal light of FIG. 1.

Figure 1:
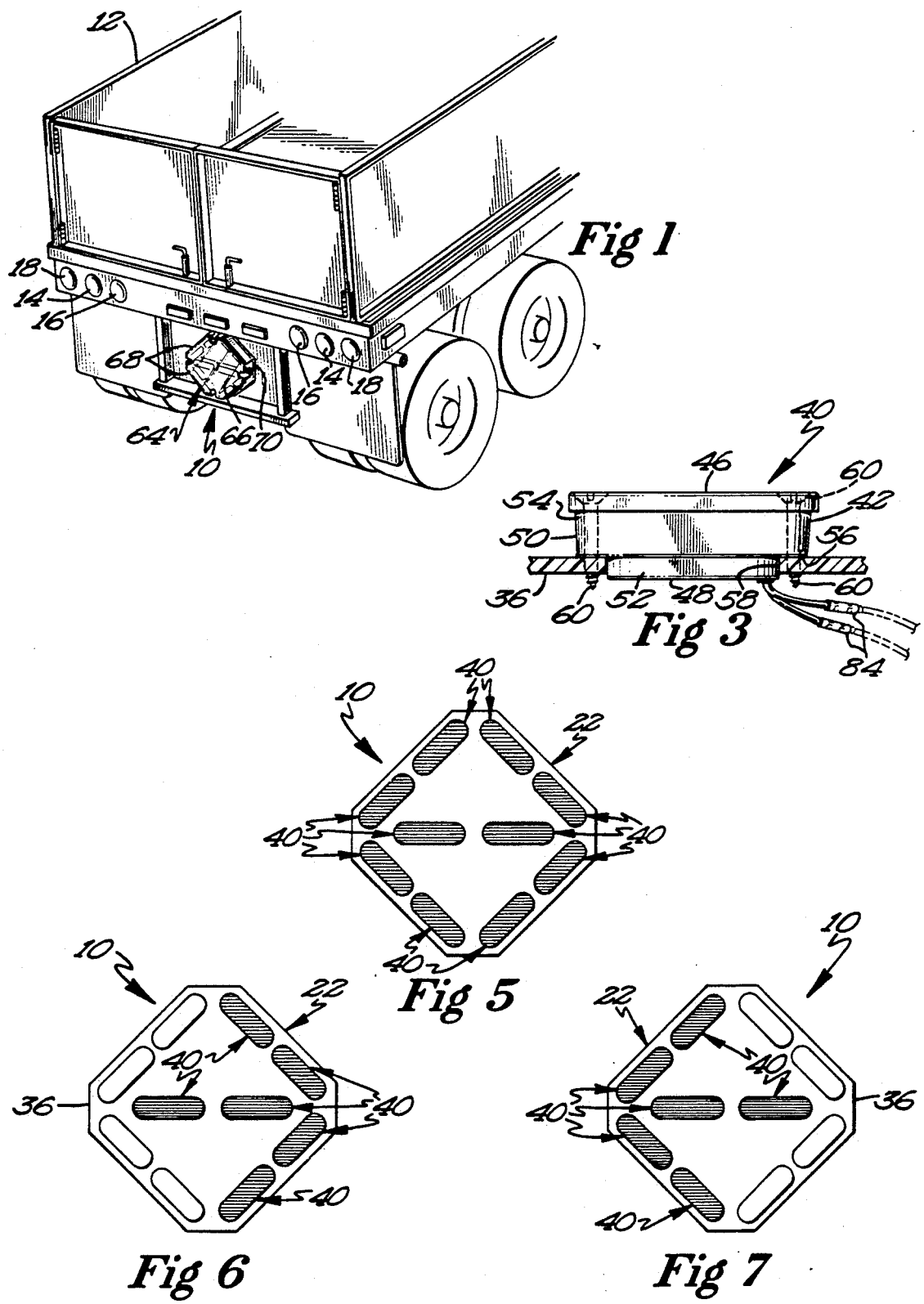
FIG. 1 shows a partial, perspective view of an auxiliary signal light secured to a semi-trailer according to the preferred teachings of the present invention.
Figure 2:
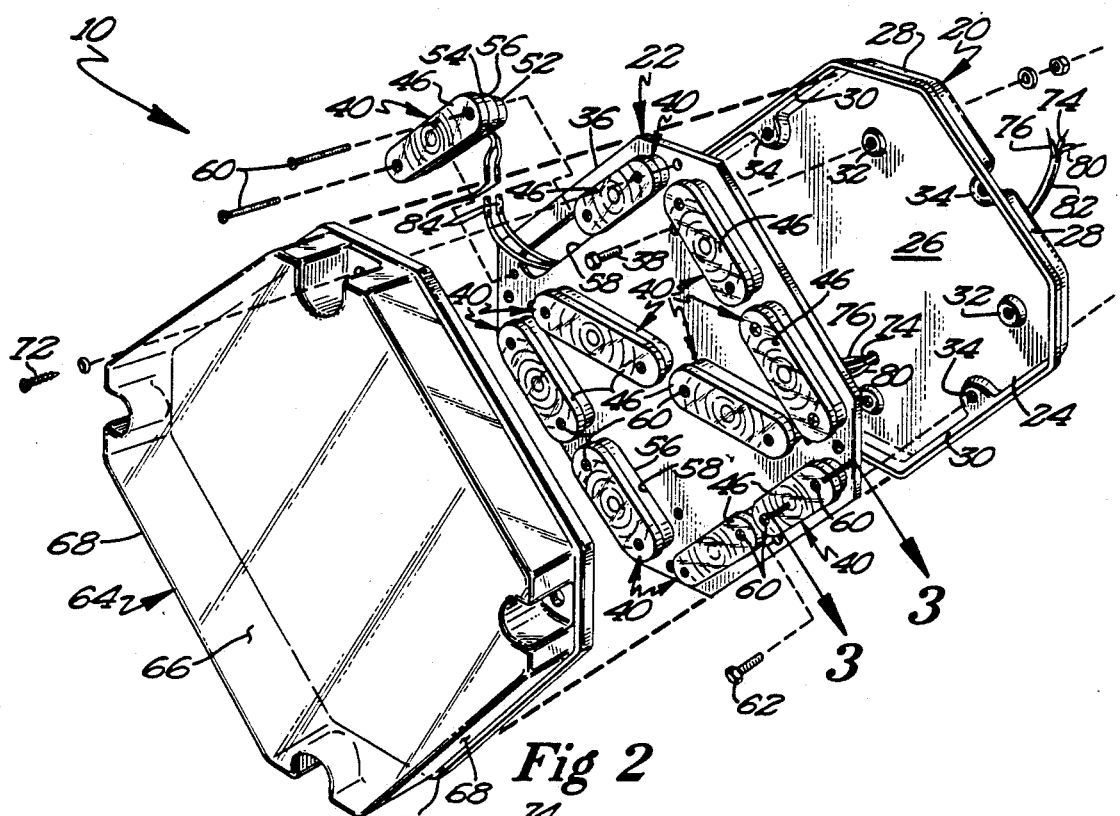
FIG. 2 shows an exploded, perspective view of the auxiliary signal lights of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "end", "sidewall", "side", "first", "second", "longitudinally", "diagonal", and similar terms are used herein, it should be understood that these terms have reference only to the structure shown in the drawings as it would appear to a person viewing the drawings and are utilized only to facilitate describing the invention.

DESCRIPTION

An auxiliary signal for use on trucks, semi-trailers, or like vehicles according to the preferred teachings of the present invention is shown in the drawings and generally designated 10. Trailer 12 of any conventional design has an electrical system including lighted signals such as tail lights 14, brake lights 16, and flasher lights 18. Typically, tail lights 14 have a red lens and only a moderate intensity lamp. Flasher lights 18 have a yellow or mixed yellow and red lens and a higher intensity lamp. Brake lights 16 also would typically use a high intensity lamp with a red lens. These are frequently enclosed behind the same lens as the tail lights.

Signal 10 according to the teachings of the present invention generally includes a base 20 and a light panel 22. Specifically, base 20 is a generally closed container having an open top 24. In the most preferred form, base 20 includes a generally square bottom 26 and sidewalls 28 which upstand generally perpendicularly therefrom. In the most preferred form, each side of bottom 26 is in the range of 12 ¾ inches (32.4 cm) long and sidewalls 28 have a height in the range of ¾ inch (1.9 cm). The free ends of sidewalls 28 define open top 24 and include an offset perimeter shoulder 30. Attachment bosses 32 and 34 upstand from and are integrally formed with bottom 26 and bottom 26 and sidewalls 28, respectively.

Light panel 22 includes a flat plate 36 having a square shape and having a size for closing open top 24 and for receipt and support on perimeter shoulder 30 of base 20. In its most preferred form, plate 36 is secured to base 20 by bolts 38 passing through apertures formed in plate 36 and bosses 32.

In its most preferred form, light panel 22 further includes a multiplicity of individual light units 40 of identical construction, which in the preferred form are factory sealed. Specifically, light panel 22 includes eight light units 40 arranged around the perimeter of flat plate 36 and specifically two light units 40 arranged longitudinally and parallel to each side of flat plate 36. Further, light panel 22 further includes two light units 40 arranged longitudinally and diagonally between two opposite corners of flat plate 36. Light units 40 generally include a base 42, a light source such as a light bulb or lamp 44, and a reflector lens 46 which closes base 42 encapsulating lamp 44 therein and which in the most preferred form is amber in color. Base 42 generally includes a closed bottom 48 and stepped sidewalls 50 which upstand generally perpendicular therefrom. Specifically, sidewalls 50 include a first portion 52 having a generally rectangular cross section integrally interconnected to a second portion 54 having a cross section of two semicircles having their ends connected by tangential, parallel sides, with a shoulder 56 being defined by the interconnection between portions 52 and 54. In the most preferred form, light units have a longitudinal length in the range of 4¼ inches (10.8 cm), a width in the range of 2 inches (5.0 cm), and a height in the range of 1 inches (3.2 cm).

Light units 40 are removably interconnected to plate 36 by a multiplicity of apertures 58 formed in plate 36 having a size and shape complementary to and for slidable receipt of portion 52 and a size smaller than portion 54 such that shoulder 56 abuts with plate 36 around apertures 58. Screws 60 extending through lens 46 and base 42 of light units 40 and threaded into plate 36 adjacent apertures 58 removably secure light units 40 to plate 36. Thus, in its most preferred form, when light bulb 44 is burned out, light unit 40 is replaced in its entirety with a new unit. Although it is possible to replace bulbs in the light units, it is believed that factory sealing which prevents bulb replacement extends bulb life, and bulb sockets in unsealed units tend to corrode making it necessary to replace the unit anyway. Thus, sealed light units 40 are believed to be advantageous even through their replacement cost is greater than the cost of a bulb.

Signal 10 may then be secured to trailer 12 by any suitable manner such as bolts 62 extending through light panel 22 and bosses 34 and secured to trailer 12. In the most preferred form, signal 10 is arranged with the diagonal light units 40 being arranged horizontally and with the perimeter light units 40 being arranged in a diamond format with the sidewalls 28 being at a 45° angle to the horizontal. Signal 10 is designed to be set into a normally vacant area at the rear of trailer 12. This area is sometimes used for license plates, but typically is simply surrounded by frame members defining a hollow. A sheet metal back may be provided to protect the space from sand or dirt picked up by the wheels.

In the most preferred form, signal 10 further includes a cover 64 formed of a translucent but not transparent material and in the preferred form is formed of smoked plastic. In the most preferred form, cover 64 includes a generally square top 66 and sidewalls 68 which upstand generally perpendicularly therefrom in the range of 1½ inches (3.8 cm). The free ends of sidewalls 68 define an open bottom and include an offset perimeter shoulder 70. Shoulder 70 is of a size and shape for receiving shoulder 30 of base 20. Cover 64 is secured to light panel 22 by screws 72 which extend through cover 64 and are threadably received in flat plate 36 of light panel 22.

It can then be appreciated that suitable sealing material such as gaskets may be provided between base 20 and light panel 22, between base 20 and cover 64, between light units 40 and flat plate 36, and/or around bolts 38 and 62 and/or screws 60 and 72.

Figure 4:
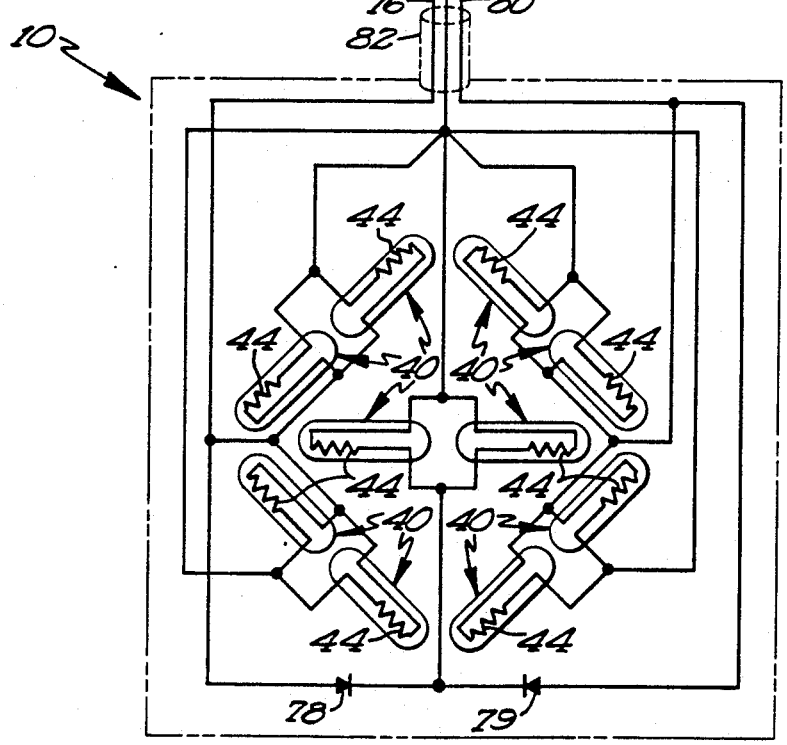
FIG. 4 shows an electrical schematic for the auxiliary sign light of FIG. 1.

An electrical schematic for electrically interconnecting bulbs 44 of light units 40 to the electrical system of trailer 12 is illustrated in FIG. 4 in its most preferred form. Specifically, common wire 74 of the electrical system is connected in parallel to each of the common sides of bulbs 44 of all light units 40. Hot wire 76 attached to turn signal light 18 on the left side of trailer 12 is electrically connected in parallel to each of the hot sides of bulbs 44 of the four perimeter light units 40 on the left side of light panel 22 and to a diode 78. Hot wire 80 attached to turn signal light 18 on the right side of trailer 12 is electrically connected in parallel to each of the hot sides of bulbs 44 of the four perimeter light units 40 on the right side of light panel 22 and to diode 79. Diodes 78 and 79 are electrically connected in parallel to each of the hot sides of bulbs 44 of the two diagonal light units 40. Wires 74, 76, and 80 may be provided in a single multi-conductor cable 82 which is properly wired into the control mechanisms, switches and the like of the electrical system of trailer 12, with cable 82 providing all the power and control requirements for signal 10. In the most preferred form, releasable connectors 84 are provided to allow ease of replacement of light units 40 in light panel 22.

Now that the basic construction of signal 10 according to the teachings of the present invention has been explained, the operation and subtle features of signal 10 can be set forth and appreciated. When all of lights 14, 16, and 18 provided as standard equipment on trailer 12 are operating properly and have clean lenses, the signal provided as original equipment would normally be adequate. But frequently that is not the case, and either a lamp is burned out in one or more of the lenses or it is covered with dirt or mud. In those cases, a signal may be actuated from the cab of the tractor and still be badly obscured behind the trailer. Auxiliary signal 10 according to the most preferred form of the teachings of the present invention is utilized in conjunction with lights 14, 16, and 18 to insure that signals for turns, stops, emergency parking and similar circumstances are provided.

Specifically, in operation as a turn directional signal, not all light units 40 of signal 10 are actuated. Thus, for a right turn signal, the four perimeter light units 40 on the right side of light panel 22 would be actuated. Thus, they present the image of a horizontal V-shape like an arrowhead pointed toward the right. Further, due to the electrical connection through diode 79, the two diagonal light units 40 are also actuated. Thus, they present the image of a horizontal shank of the arrowhead formed from the four perimeter light units 40 on the right side of light panel 22, with the resulting signal being shown in FIG. 6. For a left turn signal, the four perimeter light units 40 of the opposite, left half of signal 10 are actuated. Thus, they present the image of a horizontal V-shape like an arrowhead pointed toward the left. Further, due to the electrical connection through diode 78, the two diagonal light units 40 are also actuated. Thus, they present the image of a horizontal shank of the arrowhead formed from the four perimeter light units 40 on the left side of light panel 22, with the resulting signal being shown in FIG. 7. In the most preferred form, the arrow signals of Figures 6 and 7 would flash in unison with the regular turn signals 18 on that side of the vehicle. Thus, a following vehicle would be presented by signal 10 according to the teachings of the present invention with a flashing arrow indicating the direction of turn in addition to a simple flashing light 18. A flashing arrow signal is familiar to motorists because of its use by many highway repair crews to indicate a lane change may be necessary.

In the situation where the vehicle may be parked for an emergency—or may be operating much slower than other traffic, the use of a flashing signal using turn signals 18 on both sides of the vehicle is common. However, if
f the signals 18 is inoperative or not visible, that signal can be—and often is—completely misunderstood. When the dual-side flashers are used, all of light units 40 of signal 10 according to the teachings of the present invention will flash in unison in a manner as shown in FIG. 5. Signal 10 with all light units 40 would almost certainly not be misunderstood—nor is it likely that enough of light bulbs 44 would be inactive so that there could be an question of the situation then existing.

It can then be appreciated that the multiplicity of light units 40 each including a separate light bulb 44 is advantageous. Specifically, in the event that light units 40 become inactive such as the result of breakage and/or light bulbs 44 being burned out, this does not affect the operability of the remaining light units 40. Thus, even with some light units 40 being inactive, a sufficient indication of the intentions of the driver should be presented by signal 10 according to the teachings of the present invention to following vehicles, especially when utilized with standard equipment lights 14, 16, and 18 existing on trailer 12.

Outside sources of light such as sunlight passing through the lens of lights often creates the illusion that the light is lit when it in fact is not actuated. The smoked nature of cover 64 according to the teachings of the present invention prevents sun glare in light units 40 as previously was created in conventional lights and makes light units 40 more visible when actuated even when the sun is shining on signal 10. Further, cover 64 protects light panel 22 from the elements including dust, stones, and road debris picked up by the tires of the vehicle.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Signal for use with a vehicle having an electrical system comprising, in combination: means for providing turn direction signals for the vehicle in the form of first and second arrowheads having a generally horizontal V-shape and pointing in opposite directions forming a square having a horizontal diagonal and in the form of an arrow shank for the arrowheads lying along the horizontal diagonal, with the first and second arrowheads each including at least two lights and with the arrow shank including at least one light, wherein the lights of the first arrowhead are electrically connected in parallel to the light of the arrow shank through a first diode and the lights of the second arrowhead are electrically connected in parallel to the light of the arrow shank through a second diode with the light of the arrow shank being lit when either of the first and second arrowheads are lit; and means for securing the providing means to the vehicle.

2. The signals of claim 1 wherein the lights of the arrowhead and of the arrow shank comprise individual light units, with each individual light unit including a lamp and a reflector lens.

3. The signal of claim 2 wherein the securing means comprises, in combination: a flat plate; means for securing the light units to the flat plate; and means for securing the flat plate to the vehicle.

4. The signal of claim 3 wherein each of the individual light units further include a base, with the lamp being encapsulated by the base and the reflector lens; and wherein the means for securing the light units to the flat plate comprises a multiplicity of apertures formed in the flat plate for slidably receiving the base of the light units.

5. The signal of claim 4 wherein the means for securing the flat plate to the vehicle comprises, in combination: a base having a generally closed container shape including a bottom and sidewalls which upstand therefrom, with the sidewalls defining an open top of a size and shape for receiving the flat plate; and means for removably securing the flat plate and the base to the vehicle.

6. The signal of claim 5 further comprising, in combination: a translucent cover, with the cover and the flat plate enclosing the individual light units.

7. The signal of claim 2 further comprising, in combination: a cover, with the cover and the flat plate enclosing the individual light units; wherein the cover is nontransparent to reduce sources of light outside of the individual light units from illuminating the reflector lens of the individual light units.

8. The signal of claim 7 wherein the lamp of each individual light unit includes wires having releasable connectors to allow ease of replacement of the light units.

9. The signal of claim 1 wherein the lights further include a reflector lens; and wherein the signal further comprises, in combination: a translucent cover for covering the reflector lens and the lights, with the cover being nontransparent to reduce outside sources of light from illuminating the reflector lens of the lights.

10. The signal of claim 1 wherein the vehicle further includes tail lights, brake lights, and turn signal, with the signal being auxiliary and redundant to the turn signals of the vehicle.

11. Signal for use with a vehicle having an electrical system comprising, in combination: a light panel; a multiplicity of individual light units, with each of the individual light units including a light unit base, a source of light and a reflector lens, with the light unit base and the reflector lens enclosing the source of light; means for individually securing the individual light units to the light panel; a signal base having a generally closed container shape including a bottom and sidewalls which upstand therefrom with the sidewalls defining an open top of a size and shape for receiving the light panel; and means for removably securing the light panel and the signal base to the vehicle; wherein the light panel comprises a flat plate.

12. The signal of claim 11 wherein the individual light unit securing means comprises a multiplicity of apertures formed in the plate for slidably receiving the base of the light units.

13. The signal of claim 12 wherein the source of light of each of the individual light units includes wires having releasable connectors to allow ease of replacement of the light units.

14. The signal of claim 11 further comprising, in combination: a translucent cover, with the cover and the light panel enclosing the individual light units.

15. The signal of claim 11 further comprising, in combination: a cover, with the cover and the light panel enclosing the individual light units; wherein the cover is nontransparent to reduce sources of light outside of the individual light units from illuminating the reflector lens of the individual light units.

16. Signal for use with a vehicle having an electrical system comprising, in combination: a light panel including a multiplicity of individual light units, with each of the individual light units including a source of light and a reflector lens; and means for securing the light panel to the vehicle; wherein the light panel is square in shape, with the individual light units being arranged around the perimeter of the light panel and being arranged diagonally between two opposite corners, with the perimeter light units forming first and second arrowheads having a generally horizontal V-shape and pointing in opposite directions and diagonal light units forming an arrow shank for the first and second arrowheads.

* * * * *

UNITED STATES PATENT AND TRADEMARK OFFICE
CERTIFICATE OF CORRECTION

PATENT NO. : 5,073,768  Page 1 of 2
DATED : December 17, 1991
INVENTOR(S) : Rodney M. Willaredt It is certified that error appears in the above-identified patent and that said Letters Patent is hereby corrected as shown below:

Column 1, line 15, cancel "o" and substitute therefor --or--.

Column 2, line 19, cancel "lights" and substitute therefor --light--.

Column 2, line 24, cancel "sign" and substitute therefor --signal--.

Column 2, line 25, after "5-7" insert --show--.

Column 3, line 40, after "1" insert --¼--.

Column 5, line 29, after "if" insert --one-- and continue with line 30.

Column 5, line 30, cancel "f" and substitute therefor --of--.

Column 5, line 38, cancel "an" and substitute therefor --any--.

Column 6:
Claim 2, line 1, cancel "signals" and substitute therefor --signal--.

Claim 5, lines 3 and 7, before "base" insert --signal--.

Claim 10, line 66, cancel "signal" and substitute therefor --signals--.

Column 7:
Claim 11, line 10, after "therefrom" insert --,--.

UNITED STATES PATENT AND TRADEMARK OFFICE
CERTIFICATE OF CORRECTION

PATENT NO. : 5,073,768

DATED : December 17, 1991

INVENTOR(S) : Rodney M. Willaredt

It is certified that error appears in the above-identified patent and that said Letters Patent is hereby corrected as shown below:

Column 8, claim 16, line 21, after "and" insert --the--.

Signed and Sealed this

Twenty-third Day of March, 1993

Attest:

STEPHEN G. KUNIN

*Attesting Officer*     *Acting Commissioner of Patents and Trademarks*